(12) United States Patent
Sou

(10) Patent No.: US 11,198,063 B2
(45) Date of Patent: Dec. 14, 2021

(54) VIDEO DISPLAY SYSTEM, VIDEO DISPLAY METHOD, AND VIDEO DISPLAY PROGRAM

(71) Applicant: SQUARE ENIX CO., LTD., Tokyo (JP)

(72) Inventor: Kaei Sou, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 398 days.

(21) Appl. No.: 16/332,663

(22) PCT Filed: Sep. 12, 2017

(86) PCT No.: PCT/JP2017/032784
§ 371 (c)(1),
(2) Date: Mar. 12, 2019

(87) PCT Pub. No.: WO2018/051964
PCT Pub. Date: Mar. 22, 2018

(65) Prior Publication Data
US 2021/0268379 A1 Sep. 2, 2021

(30) Foreign Application Priority Data
Sep. 14, 2016 (JP) .............................. JP2016-179877

(51) Int. Cl.
*A63F 13/52* (2014.01)
*A63F 13/26* (2014.01)

(52) U.S. Cl.
CPC .............. *A63F 13/52* (2014.09); *A63F 13/26* (2014.09); *A63F 2300/8082* (2013.01)

(58) Field of Classification Search
CPC ... A63F 13/52; A63F 13/26; A63F 2300/8082
See application file for complete search history.

(56) References Cited

U.S. PATENT DOCUMENTS 5,917,460 A * 6/1999 Kodama ................. G06F 3/012
345/8
7,053,917 B2 * 5/2006 Kato ........................ G09G 5/00
345/672

(Continued)

FOREIGN PATENT DOCUMENTS

JP 08-21975 1/1996
JP 2014-146871 8/2014

(Continued)

OTHER PUBLICATIONS

International Search Report (ISR) from International Searching Authority (Japan Patent Office) in International Pat. Appl. No. PCT/JP2017/032784, dated Nov. 14, 2017.

(Continued)

*Primary Examiner* — Malina D. Blaise
(74) *Attorney, Agent, or Firm* — Greenblum & Bernstein, P.L.C.

(57) ABSTRACT

To prevent visually induced motion sickness that occurs during viewing of three-dimensional content using a display. A video display system and a video display program for a display include a computer for displaying content video on a display unit of the display as a virtual reality space, wherein the computer displays, on the display unit, three-dimensional video data in which a content video region and a fixed background image region surrounding the content video region are set.

18 Claims, 7 Drawing Sheets

| Fixed frame ID | Fixed background image type | Standard fixed background image region minimum value | User A regulation value | User B regulation value | Remarks |
|---|---|---|---|---|---|
| W01 | Parallelogram frame | 30% | +2 | 0 | |
| W02 | Deformed quadrangular frame | 25% | +1 | 0 | |
| W03 | Circular frame | 30% | 0 | 0 | |
| W04 | Polygonal frame | 30% | 0 | 0 | |
| W05 | Lower quadrangular frame | 35% | +1 | +1 | |
| W06 | Lower oval frame | 25% | +1 | 0 | |
| W07 | Vertical frame | 40% | +1 | 0 | |
| W08 | Lateral frame | 35% | +1 | 0 | |

(56) References Cited

U.S. PATENT DOCUMENTS

| | | | |
|---|---|---|---|
| 8,872,974 B2* | 10/2014 | Van Lier | A61M 21/00 |
| | | | 348/563 |
| 9,191,658 B2 | 11/2015 | Kato et al. | |
| 9,645,395 B2* | 5/2017 | Bolas | G02B 27/0093 |
| 10,139,902 B2* | 11/2018 | Inomata | G06F 3/012 |
| 10,175,487 B2* | 1/2019 | Benko | G06T 19/006 |
| 10,372,205 B2* | 8/2019 | Young | G06F 3/013 |
| 2002/0099257 A1* | 7/2002 | Parker | G02B 27/0093 |
| | | | 600/27 |
| 2009/0002142 A1* | 1/2009 | Morimoto | H04N 21/4312 |
| | | | 340/425.5 |
| 2009/0103898 A1* | 4/2009 | Morioka | G11B 27/28 |
| | | | 386/248 |
| 2010/0303444 A1* | 12/2010 | Sasaki | G11B 27/322 |
| | | | 386/248 |
| 2012/0105483 A1* | 5/2012 | Fedorovskaya | G02B 27/017 |
| | | | 345/660 |
| 2013/0235169 A1 | 9/2013 | Kato et al. | |
| 2014/0050458 A1* | 2/2014 | Mochinaga | H04N 13/337 |
| | | | 386/239 |
| 2014/0267420 A1* | 9/2014 | Schowengerdt | G06T 19/006 |
| | | | 345/633 |
| 2014/0268356 A1* | 9/2014 | Bolas | G02B 27/017 |
| | | | 359/630 |
| 2014/0375663 A1 | 12/2014 | Pfaffe | |
| 2016/0170482 A1* | 6/2016 | Yajima | G06F 3/012 |
| | | | 345/8 |
| 2016/0246057 A1* | 8/2016 | Hasegawa | H04N 5/7491 |
| 2017/0011706 A1* | 1/2017 | Namkung | G06F 1/1632 |
| 2017/0041544 A1* | 2/2017 | Kobayashi | G02B 27/017 |
| 2017/0228931 A1 | 8/2017 | Parker et al. | |
| 2017/0289615 A1* | 10/2017 | Kobayashi | H04N 21/242 |
| 2017/0366805 A1* | 12/2017 | Sevostianov | H04N 13/366 |
| 2018/0144521 A1* | 5/2018 | Chao | G06T 1/20 |
| 2018/0181196 A1* | 6/2018 | Lee | G06T 7/70 |
| 2020/0322696 A1* | 10/2020 | Dvir | H04N 13/279 |
| 2020/0410740 A1* | 12/2020 | Croxford | G06T 15/005 |

FOREIGN PATENT DOCUMENTS

| | | |
|---|---|---|
| WO | 2007/086431 | 8/2007 |
| WO | 2012/172719 | 12/2012 |
| WO | 2017/139023 | 8/2017 |

OTHER PUBLICATIONS

Office Action from Japan Patent Office (JPO) in Japanese Patent Appl. No. 2018-539717, dated Jul. 7, 2020, together with an English language translation.

Extended European Search Report from the European Patent Office (EPO) dated Mar. 23, 2020 for the related European Patent Application No. 17850866.9.

* cited by examiner

| Fixed frame ID | Fixed background image type | Standard fixed background image region minimum value | User A regulation value | User B regulation value | Remarks |
|---|---|---|---|---|---|
| W01 | Parallelogram frame | 30% | +2 | 0 | |
| W02 | Deformed quadrangular frame | 25% | +1 | 0 | |
| W03 | Circular frame | 30% | 0 | 0 | |
| W04 | Polygonal frame | 30% | 0 | 0 | |
| W05 | Lower quadrangular frame | 35% | +1 | +1 | |
| W06 | Lower oval frame | 25% | +1 | 0 | |
| W07 | Vertical frame | 40% | +1 | 0 | |
| W08 | Lateral frame | 35% | +1 | 0 | |

VIDEO DISPLAY SYSTEM, VIDEO DISPLAY METHOD, AND VIDEO DISPLAY PROGRAM

TECHNICAL FIELD

The present invention relates to a video display system, a video display method and a video display program for a display which can view a content video as a virtual reality space by using a display. Particularly, the present invention relates to a video display system, a video display method and a video display program for a display which can prevent a visually induced motion sickness during viewing a stereoscopic three-dimensional content particularly by using a three-dimensional display.

BACKGROUND ART

In recent years, there has been viewed the three-dimensional content corresponding to the virtual reality space of a stereoscopic game by using a three-dimensional head mounted display (also called as a head worn display, a head mounted display or HMD). In the three-dimensional content, it has been known that a visually induced motion sickness similar to a motion sickness such as headache, dizziness (disturbance of the sense of balance), nausea and sick feeling occurs during the user's viewing. Causes for which the visually induced motion sickness occurs have not medically clarified, however, the visually induced motion sickness has been thought to run into a symptom similar to the motion sickness, for example, due to a difference in sense between a visually obtained motion and a motion obtained by the other body senses (for example, a difference in sense in which the body does not actually move in spite of the visual movement).

In the case of this visually induced motion sickness, one of them exists in a matter that a brain misidentifies a hallucination on the basis of a difference in information, for example, in a case where the visual information is different from a balance information identified by a semicircular canal. This can be estimated to be derived by a poisoning which is a most likely cause for the hallucination of the human, and a physiological response, that is, hallucination=poison=vomiting which occurs as a survival instinct in the process of the human evolution. It is thought to be a brain learning function that the sickness recedes by boarding or embarkation for a long period of time or continuously playing a game for a long period of time.

Further, as an environmental condition that the visually induced motion sickness is easy to occur, there can be listed up, for example, an environmental condition that a room lighting is insufficient and a circumference is dark, an environmental condition that fatigue occurs due to a long time play, an environmental condition that an afterimage remains as seen in a liquid crystal television set, an environmental condition that a screen is too small (it is necessary to pay close attention) or too large (a field of view is occupied to cause an illusion), an environmental condition that has poor visibility (a ceiling is low, and the above visibility is blocked), an environmental condition that the motion is intense (a problem is easy to occur particularly when a vertical motion is great), an environmental condition that a frame rate is low, an environmental condition that a camera motion is intense), an environmental condition that a three-dimensional modeling is distorted, an environmental condition that a character can not be moved accurately in a desired direction due to poor habituation in a game operation or a system, an environmental condition that a camera (a point of view) rapidly pans and zooms in an unintended direction, an environmental condition of a main character looking-down type game, an environmental condition that a main character moves in a different direction from the direction intended by a player, an environmental condition that the main character does not face the direction which the player desires to face, an environmental condition that a moving speed of the main character is different from an intended speed, and an environmental condition that views a play of other people.

As a document describing a technique for preventing the visually induced motion sickness, the following patent document 1 can be listed up. This patent document 1 describes an image processing technique of measuring a standard position of an inner corner of eye or a corner of eye in relation to a head mounted display of a viewer, detecting a difference between a position of the inner corner of eye or the corner of eye in relation to the head mounted display of the viewer during content viewing and the standard position as a positional deviation, and performing an image processing in relation to a three-dimensional video in such a manner that the three-dimensional video displayed on the head mounted display rotates or parallel shifts in correspondence to the detected positional deviation.

CITATION LIST

Patent Literature

PATENT LITERATURE 1: WO2012/172719

SUMMARY OF INVENTION

Technical Problem

The image processing technique described in the patent document 1 can prevent the visually induced motion sickness by controlling the image display in such a manner that the three-dimensional video displayed on the head mounted display rotates and parallel shifts in correspondence to the positional deviation in a case where the mounting position in the viewer of the head mounted display to the head deviates.

However, the technique described in the patent document 1 is a technique of preventing the visually induced motion sickness caused by the mounting deviation of the head mounted display, can not correspond to the visually induced motion sickness caused by the afterimage, the illusion, the intense motion and the other causes as mentioned above, and has a problem that the visually induced motion sickness highly likely occurs.

An object of the present invention is to solve the problem according to the prior art mentioned above, and to provide a video display system, a video display method and a video display program for a display which can prevent the visually induced motion sickness occurring during viewing the content corresponding to the virtually reality space by using the display.

Solution to Problem

According to a non-limited view point, a video display system, a video display method and a video display program according to one mode for carrying out the present invention is mainly characterized by including a computer which displays a content video as a virtual reality space on a display unit of a display, the computer displaying on the display unit a three-dimensional video data setting a content video region and a fixed background image region surrounding at least a part of the content video region in the display unit.

Effect of Invention

The video display system, the video display method and the video display program can prevent the visually induced motion sickness occurring during viewing the virtual content by displaying on the display unit of the display the three-dimensional video data setting the fixed background image region surrounding at least a part of the content video region.

DESCRIPTION OF EMBODIMENTS

A description will be given below of a detail of a video display system to which a video display method and program for a three-dimensional display according to an embodiment of the present invention is applied, with reference to the accompanying drawings.
[Description of Video Display System]

Figure 3A:
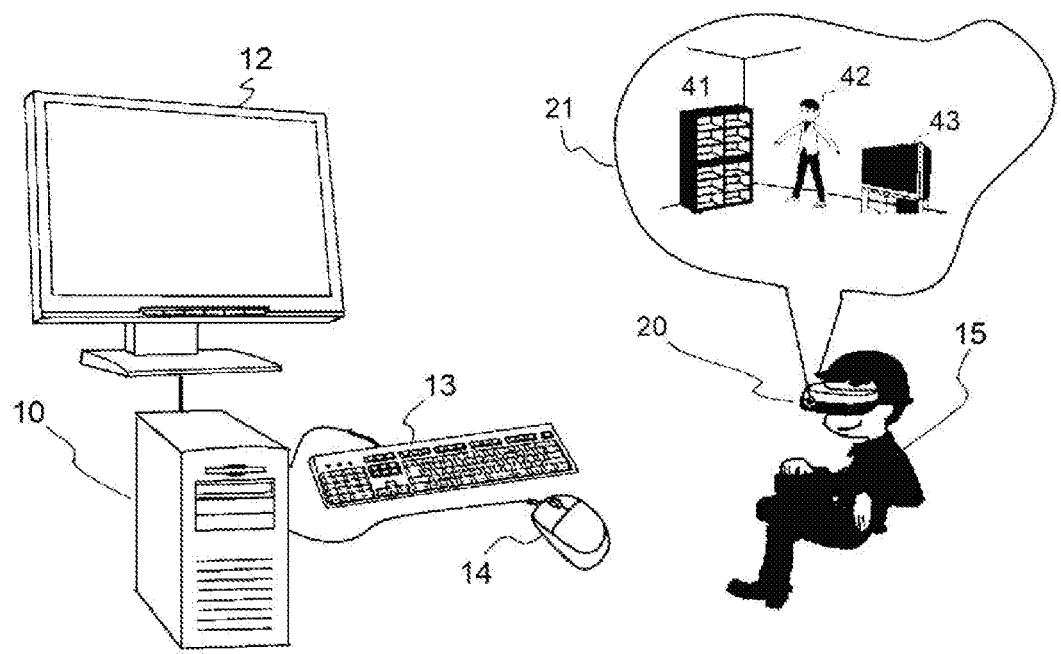
FIG. 3A is a view showing a hardware example of a structure viewing a content by using a three-dimensional head mounted display which is a subject of the present invention.

A video display system which is a subject of the present invention provides a content for a virtual reality space such as a three-dimensional image to a user by using a three-dimensional head mounted display (HMD) (corresponding to an example of a display). The system is constructed, for example, as shown in FIG. 3A, by a computer 10 which installs a content data such as a three-dimensional image and an HMD application software, a display 12 which is a normal image output destination of the computer 10, a keyboard 13 and a mouse 14 which are input devices for operating the computer 10, a head mounted display 20 which is mounted to a head of a user 15, and a game specific controller (not shown) in a case where the content date is a game.

The computer 10 is constructed by hardware devices such as CPU, memories, SSD, hard disc devices, GPU and various interfaces, in the same manner as a general personal computer, and executes with the CPU a data processing on the basis of OS which is stored in a storage means such as the hard disc device, various application software and various data. This computer 10 is structured, in the case of the present embodiment, such that the content data such as the three-dimensional image and the HMD application software are installed in the storage means, and the computer 10 and the head mounted display 20 display together a user viewing field screen 21 corresponding to the three-dimensional image content data in relation to a user 15, so that the user 15 can move close to and away from, and look around an object contained in the three-dimensional image by moving a head of the user.

Figure 3B:
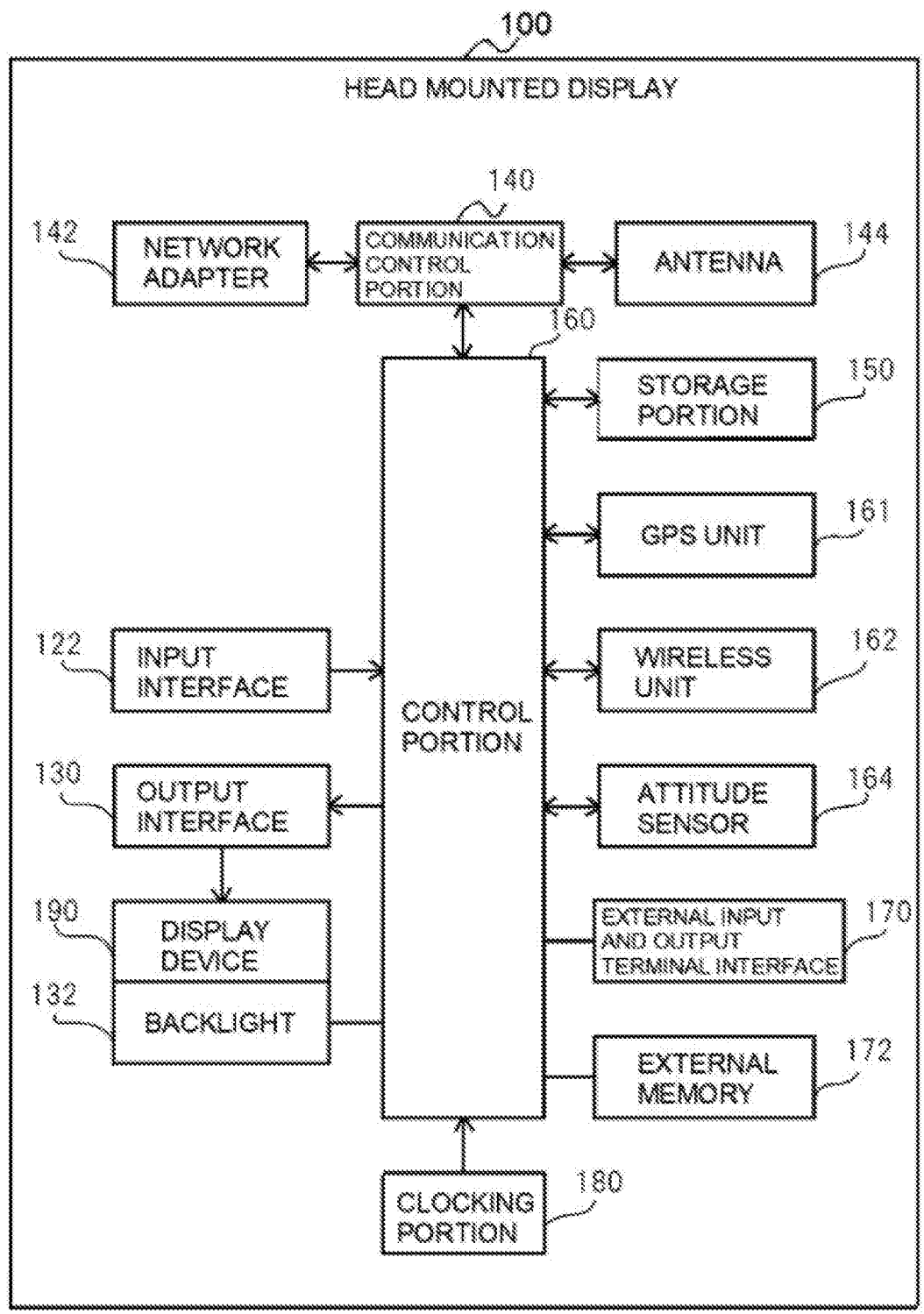
FIG. 3B is a view showing a hardware example of the three-dimensional head mounted display which is the subject of the present invention.

The head mounted display 20 is provided with an input interface 122, an output interface 130, a backlight 132, a communication control portion 140, a network adapter 142, an antenna 144, a storage portion 150, a GPS unit 161, a wireless unit 162, an attitude sensor 164, an external input and output terminal interface 170, an external memory 172, a clocking portion 180, a mount display device (a display unit) 190, and a control portion 160, as shown in FIG. 3B. These function blocks can be achieved in various types only by the hardware devices, only by the software, or by a combination thereof.

The control portion 160 is a main processor which processes and outputs signals such as an image signal and a sensor signal, commands and data. The input interface 122 receives an operation signal and a setting signal from an input button, and feeds them to the control portion 160. The output interface 130 receives the image signal from the control portion 160 and displays it on a display device 190. The backlight 132 feeds a back light to a liquid crystal display which constructs the display device 190.

The communication control portion 140 transmits the data input from the control portion to an external portion according to a wired or wireless communication via the network adapter 142 or the antenna 144. The communication control portion 140 further receives the data from the external portion and outputs it to the control portion 160 according to the wired or wireless communication via the network adapter 142 or the antenna 144.

The storage portion 150 temporarily stores the data, the parameter and the operation signal which the control portion 160 processes. The GPS unit 161 receives a positional information from a GPS satellite and feeds it to the control portion 160 according to the operation signal from the control portion 160. The wireless unit 162 receives the positional information from a wireless base station and feeds it to the control portion 160 according to the operation signal from the control portion 160. The attitude sensor 164 detects an attitude information such as a direction and an inclination of the main body portion 110 in the head mounted display 20. The attitude sensor 164 is achieved by appropriately combining a gyro sensor, an acceleration sensor and an angular acceleration sensor, and is provided with a detecting function of detecting a direction in which a visual line of the user moves.

The external input and output terminal interface 170 is an interface for connecting a peripheral equipment such as a universal serial bus (USB) controller. The external memory 172 is an external memory such as a flash memory, and the clocking portion 180 sets a time information according to the setting signal from the control portion 160 and feeds the time data to the control portion 160.

[Description of Visually Induced Motion Sickness]

Figures 4, 5:
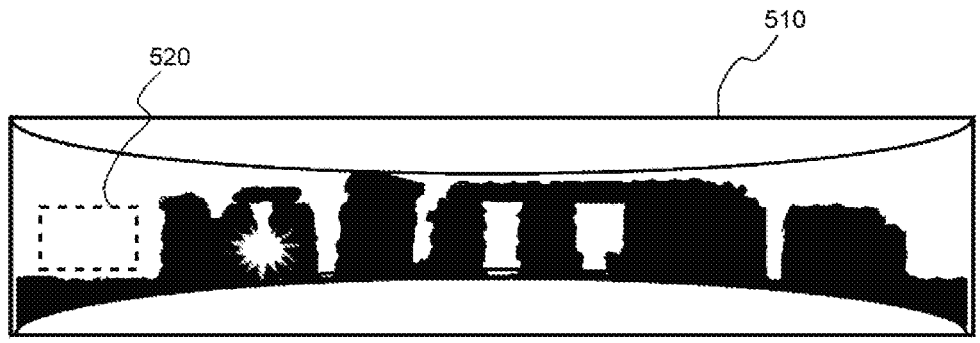
FIG. 4 is a view for describing a three-dimensional image data and a viewer viewing field data according to an embodiment of the present invention.
FIG. 5 is a view showing a control table example of a fixed background image region according to the present embodiment.

The video display system to which the video display program for the three-dimensional head mounted display according to the present embodiment is structured such as to prevent or reduce the visually induced motion sickness (the similar symptom to the motion sickness such as headache, dizziness (disturbance of the sense of balance), nausea and sick feeling) which occurs during viewing the three-dimensional content by using the three-dimensional head mounted display as mentioned above. This visually induced motion sickness is deemed to be derived by the user 15 feeling the visually induced motion sickness such as dizziness. In a case where a book cabinet 41 and a television set 43 are arranged as a viewing field screen for the user, for example, in a room shown in an upper stage of FIG. 6, and the software detecting the head motion rapidly pans the screen leftward (a direction of an arrow A) on the basis of the attitude sensor including the gyro sensor, the acceleration sensor and the angular acceleration sensor when the user 15 slowly move its head from a state displaying a three-dimensional image data S1 seeing from a rightward diagonal direction of a front face a state in which a person 42 stands up between the book cabinet and the television set 43, and moves the screen to a three-dimensional video data Sn seeing from a leftward rear direction of the person 42, a lot of three-dimensional video data exist from the three-dimensional video data S1 to the three-dimensional video data Sn, and the user 15 seeing the continuously displayed video feels the visually induced motion sickness. Particularly, the three-dimensional image data using the three-dimensional head mounted display prepares a three-dimensional video data 510 having a great lateral width, for example, as shown in FIG. 4, for three-dimensionally showing the virtual space to the user. In a case where the software provides the user a range of a viewer viewing field video 520 partly extracted from the three-dimensional video data 510, and displays the range of the viewer viewing field video 520 in a left side of the three-dimensional video data 510 in such a manner as to move rapidly to a right end side, the visually induced motion sickness highly likely occurs in the user.

First Embodiment

Figure 1:
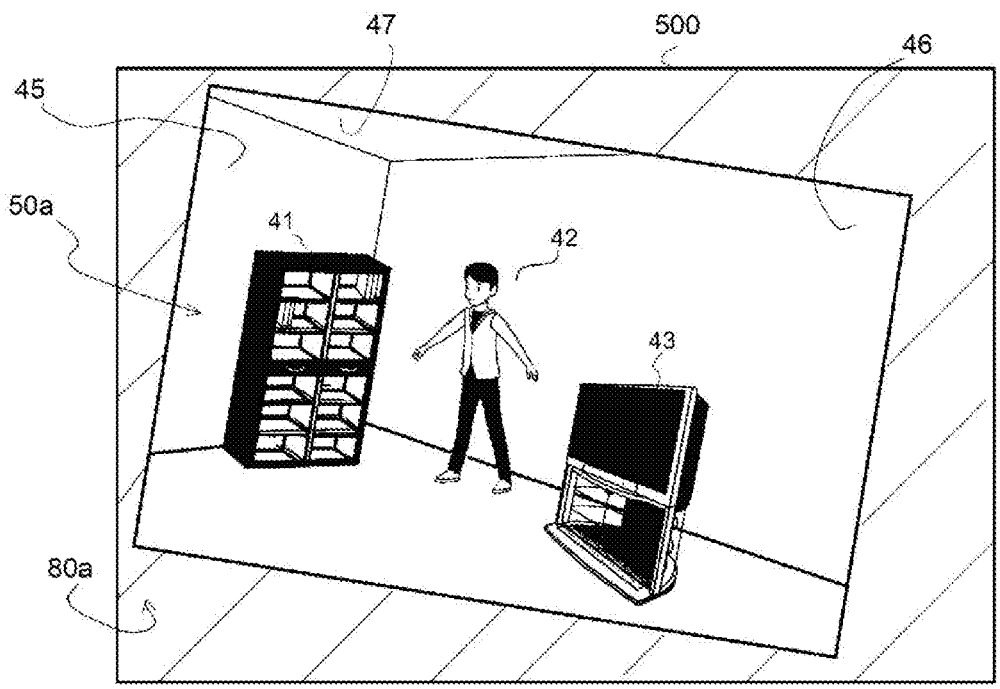
FIG. 1 is a view showing a user viewing field screen example of a three-dimensional content according to a first embodiment of the present invention.
Figure 6:
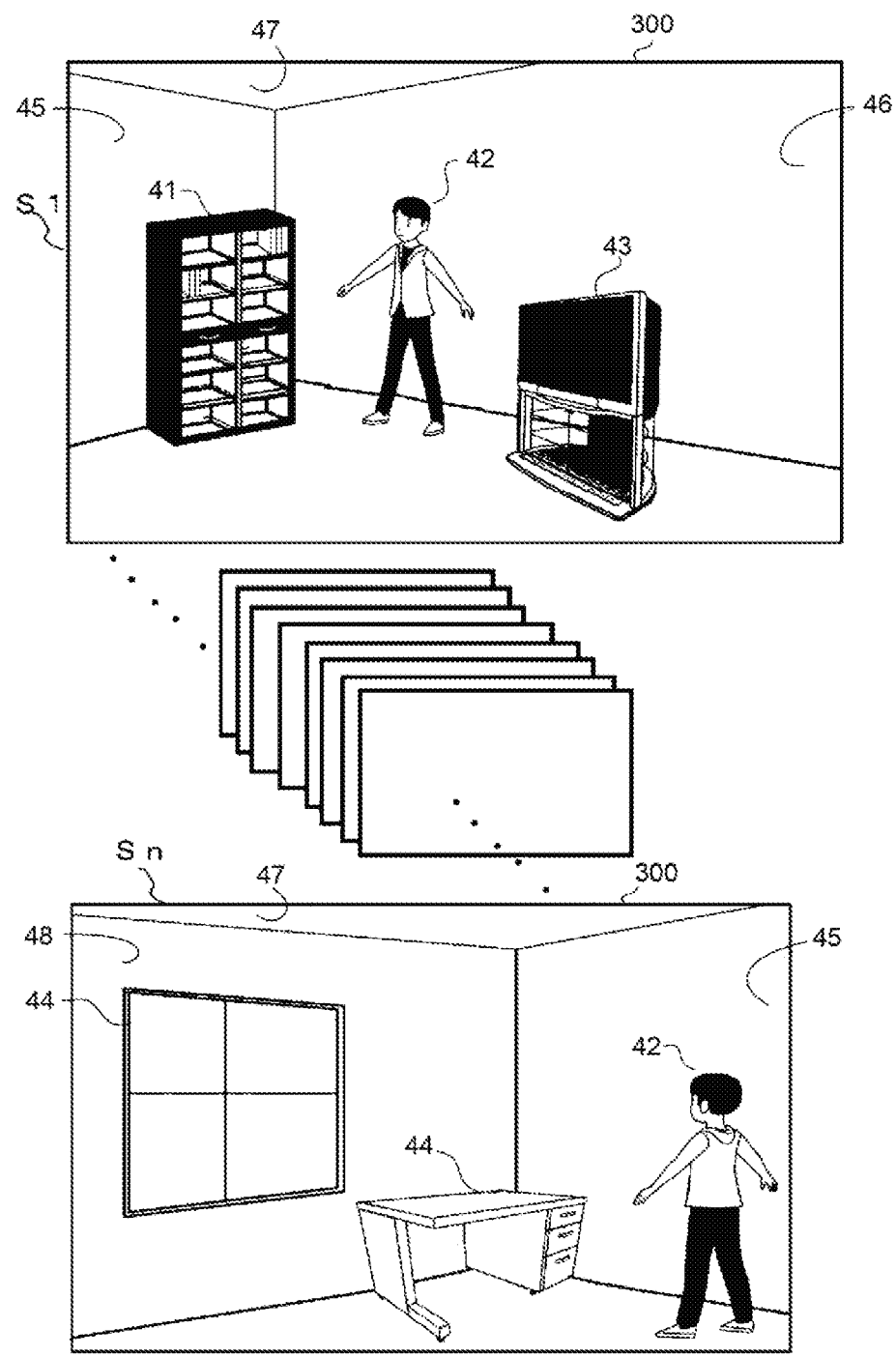
FIG. 6 is a view showing a user viewing field screen example of a three-dimensional content according to a prior art.

A video display system to which the video display program and method for the three-dimensional head mounted display according to a first embodiment of the present invention is different, for example, from the conventional one which provides the user only the three-dimensional video data 300 shown in FIG. 6 mentioned above as the viewer viewing field data, and displays so as to arrange a deformed quadrangular content video region 50a corresponding to the viewer viewing field data in the three-dimensional video data 500, and arrange a fixed background image region 80a in such a manner as to surround a whole circumference (a whole surface of circumference/a whole side of circumference) of the content video region 50a, as shown in FIG. 1. The fixed background image region 80a is structured such as to surround like a wide frame fixed to the content video region 50a. The fixed background image region 80a is preferably a white or black or other simple color, a predetermined pattern design which can be clearly viewed and identified from the content video region 50a or a background image which is similar to the simple color.

The viewer viewing field video displayed in the content video region 50a in the present invention is an entire content video which is previously set in such a manner as to be in the viewing field of the user in an optional scene of the content, and is not extracted partly from the entire content video. For example, the entire content video is displayed in the content video region 50a as the viewer viewing field video per frame unit in a case where the content is one frame of a frame divided cartoon, and is not a part of one frame video of the cartoon, for example, which has to be displayed by right.

Further, an area ratio between a fixed background image region 80b contained in the three-dimensional video data 500 and the whole is set such that the fixed background image region 80b is from about 20% to 50% for recognizing that the image is fixed in the viewing field of the viewer, and is preferably about 30% for making the content region comparatively large. More specifically, the area ratio occupied by the fixed background image region in comparison with the total area of the fixed background image region and the content video region is from about 20% to 50%, and is preferably about 30% for making the content region comparatively large.

SECOND EMBODIMENT

Figure 2:
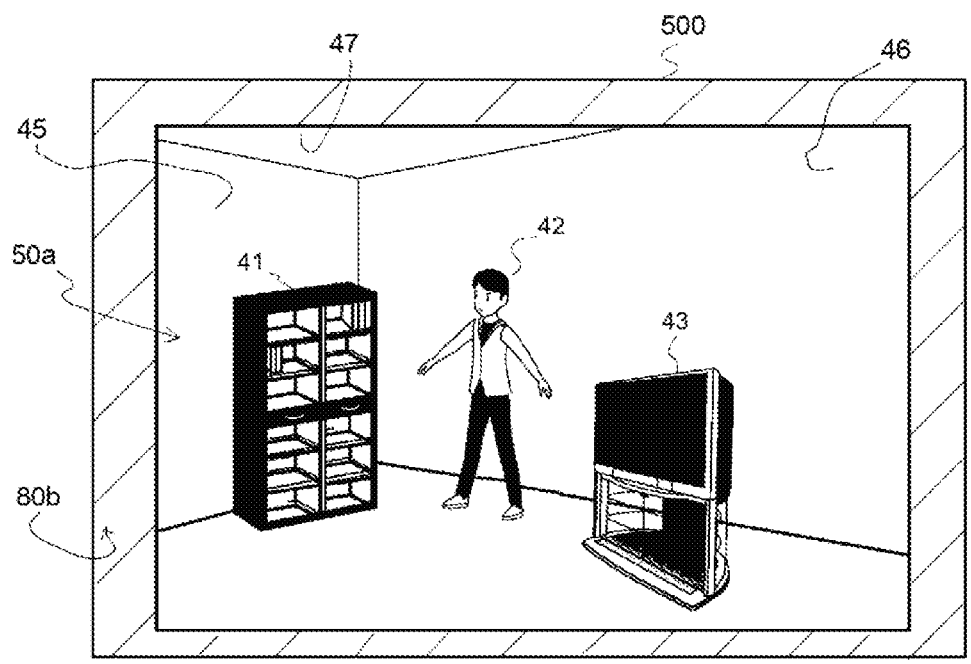
FIG. 2 is a view showing a user viewing field screen example of a three-dimensional content according to a second embodiment of the present invention.

The video display system 3 according to the present embodiment is described about the example in which the content video region 50a is formed into the deformed quadrangle, and the fixed background image region 80b around the content video region 50a is set to the remaining deformed polygonal region. However, the shape of the fixed background image region according to the present invention is not limited to this. For example, the shape of the fixed background image region according to the present invention may be displayed, as shown in FIG. 2, in such a manner as to form the content video region 50a into a parallelogram and arrange a thick-frame shaped fixed background image region 80b surrounding the parallelogram. The shape of the content video region may be a circular shape, a trapezoidal shape, a polygonal shape and an oval shape, and the shape of the fixed background image region may be formed into such a shape as to surround the content video region, and may be alternatively formed into a rectangular quadrangle arranged only in a lower side, only in an upper side or only in any one of right and left sides of the three-dimensional video data or into a circular arc shape. In the case of these shapes, an occupancy equal to or more than 30% is desirable, for example, since the position occupied in the three-dimensional video display screen is deviated.

The video display system according to the present invention is structured such as to arrange the fixed background image region in addition to the content video region as mentioned above, and the drawing video is created by the GPU of the computer 10 or the control portion 160 of the head mounted display 20.

Third Embodiment

Further, in the embodiment, the description is given of the example in which the shapes and the layouts of the content video region and the fixed background image region are fixed. However, the visually induced motion sickness is individually different in the users, and is thought to change on the basis of a level of tiredness and a habituation of the user. As a result, the video display system according to the present invention may be added a function of setting a standard content video region shape per a fixed frame ID (identification number), a standard fixed background image region shape and a minimum ratio of the area of the fixed background image region as an initial condition value in a video mode control table as shown in FIG. 5, initially displaying the three-dimensional video data on the basis of the initial condition value, learning an individual body condition per the user by the software increasing or decreasing the minimum rate of the area of the fixed background image region in correspondence to the user while designating the fixed frame ID (identification number) when the user feeling the visually induced motion sickness inputs "visually induced motion sickness occurring" by using the keyboard or the controller, and automatically regulating the fixed background image region, for example, expanding it. This regulation is not limited to the image rate of the fixed background image region, but may be structured such as to regulate the shape, the pan speed and the frame rate of the fixed background image region, and the video mode control table is stored in the computer 10 or the storage means of the head mounted display 20.

The video mode control table may be structured such as to store only the standard content video region shape, for example, shown in FIG. 5 mentioned above, the standard fixed background image region shape and the minimum rate of the area in the fixed background image region, and display the three-dimensional video data by referring them every display of the content by the software or when being designated.

Fourth Embodiment

Figure 7:
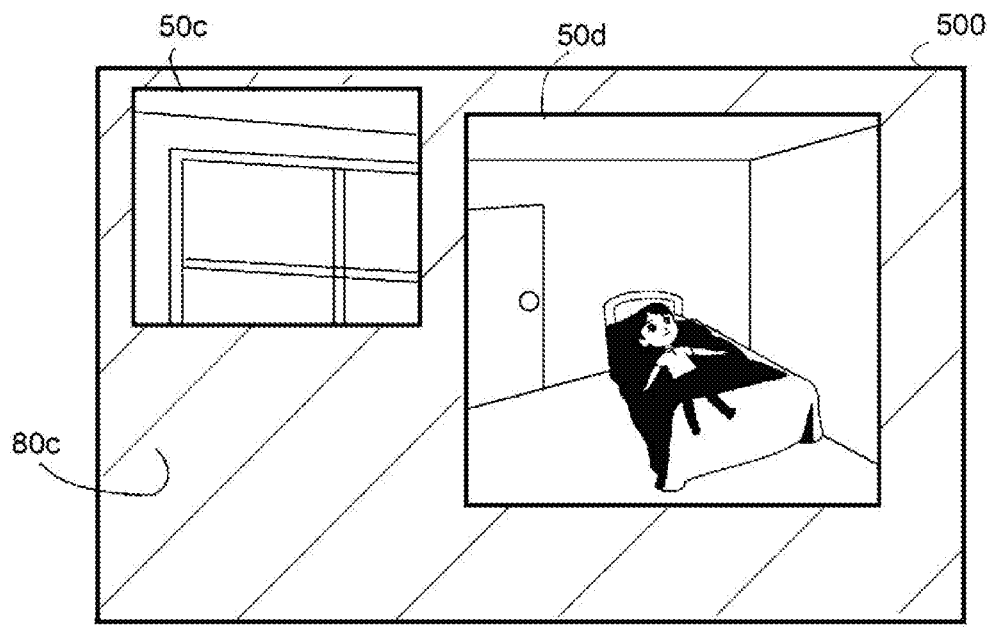
FIG. 7 is a view showing a user viewing field screen example of a three-dimensional content according to a fourth embodiment of the present invention.
Figure 8:
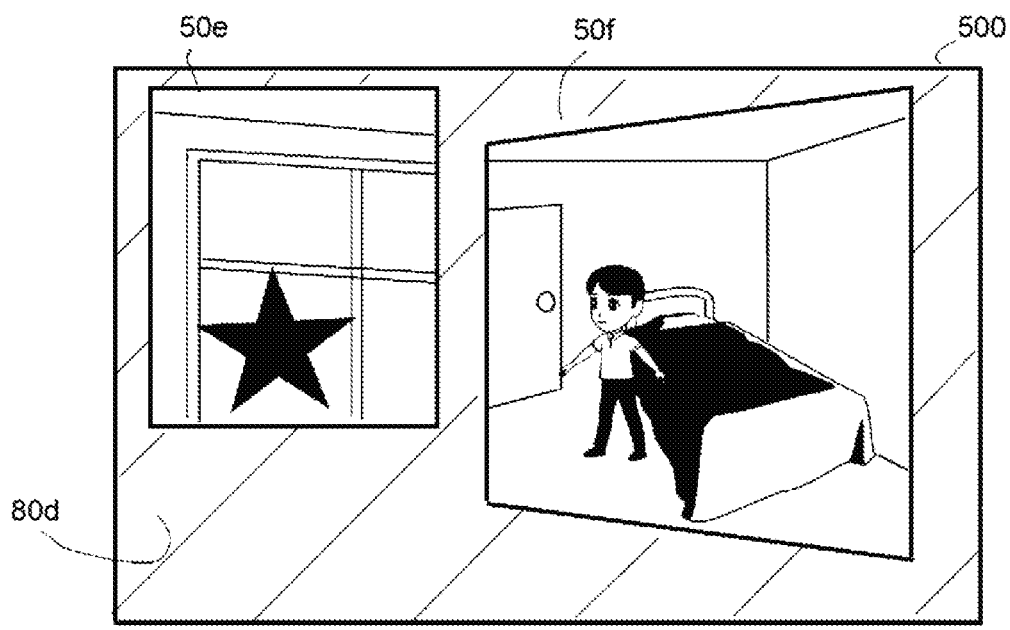
FIG. 8 is a view showing a user viewing field screen example of the three-dimensional content according to the fourth embodiment of the present invention.
Figure 9:
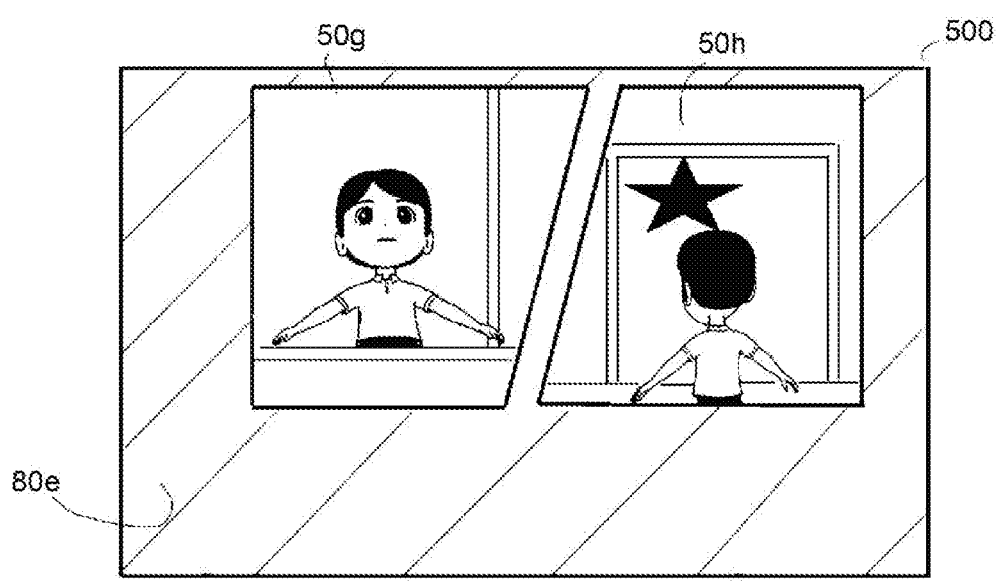
FIG. 9 is a view showing a user viewing field screen example of the three-dimensional content according to the fourth embodiment of the present invention.

In the embodiments 1 and 2 mentioned above, the description is given of the example in which one content video region is arranged in the three-dimensional video data, and the fixed background image region is arranged in such a manner as to surround the periphery of this one content video region. However, the present invention is not limited to this, but may be structured, as shown in FIGS. 7 to 9, such that a plurality of content video regions are arranged in the three-dimensional video data, and the fixed background image region is arranged in such a manner as to surround the periphery of the plurality of content video regions.

In the content video region according to the embodiment, the content is constructed by a plurality of page spaces, and is a cartoon on the basis of a paper medium (which may be the same expression style digital data as the paper medium) progressing in correspondence to unfoldment of story. In a case where the page space is constructed by a plurality of frames, the computer executes a drawing function as follows, thereby changing the fixed background image region and preventing the visually induced motion sickness.

(1) a function of dividing a content for one page space constructing the content into a plurality of content video regions which are divided into a plurality of frame units.

(2) a function of arranging the divided plurality of content video regions so as not to be in contact with the three-dimensional video data.

(3) a function of arranging in such a manner that a fixed background image region surrounds the plurality of content video regions.

(4) a function of changing the fixed background image region on the basis of the content video.

(5) a function of dividing the content video region into a plurality of regions on the basis of the progress of the content video and displaying.

(6) a function of sequentially displaying the plurality of divided content video regions on the basis of the progressing direction of the content video.

(7) a function of sequentially displaying the content video regions divided in a direction that an object included in the content video moves on the basis of the progressing direction of the content video.

(8) a function of sequentially displaying the content video regions divided in a direction that a visual line of a user detected by the head mounted display moves.

(9) a function of changing a magnitude of the fixed background image region on the basis of the progress of the content video.

Describing this specifically, a video example shown in FIG. 7 arranges a content video region 50c displaying a content video in which a body lies on a bed corresponding to a divided content video and a window, in a left upper side of a three-dimensional video data 500, and arranges a fixed background image region 80c surrounding a periphery of quadrangles of these two content video regions 50d and content video region 50c.

A video example shown in FIG. 8 arranges a content video region 50e (a content video in which an object like a star is seen out of a window) and a content video region 50f (a content video in which a body stands up from a bed) in a left upper side of a three-dimensional video data 500, and arranges a fixed background image region 80d covering a periphery of quadrangles of these two content video region 50e and content video region 50f.

A video example shown in FIG. 9 arranges a content video region 50g (a front face content video of a body seeing outside from a window) and a content video region 50h (a content video seeing the boy seeing outside from the window from a rear side) in a left upper side of a three-dimensional video data 500, and arranges a fixed background image region 80e covering a periphery of quadrangles of these two content video region 50g and content video region 50h.

As mentioned above, the video display system according to the present embodiment can change the fixed background image region in correspondence to the progress of the content and further prevent the visually induced motion sickness, for example, by optionally executing the function of dividing the content video region into a plurality of regions on the basis of the progress of the content video and displaying, the function of sequentially displaying the plurality divided content video regions on the basis of the progressing direction of the content video, the function of sequentially displaying the content video region divided in the direction in which the object contained in the content video moves on the basis of the progressing direction of the content video, and the function of changing the magnitude of the fixed background image region on the basis of the progress of the content video.

Fifth Embodiment

In the embodiment mentioned above, the description is given of the video display system to which the video display program corresponding to a motion picture for the three-dimensional head mounted display is applied. However, the present invention can be also applied to a video display system to which a video display program for a game is applied. In the video display program for the game, a game story is variously branched by a selection operation in correspondence to a game progress of a player, and a VR display video is also changed every branched unfoldment scene.

Thus, the video display system according to the present embodiment may be structured such as to set a display area rate of a fixed background image region surrounding a whole circumference (a whole surface of circumference/a whole side of circumference) of the content video region per video displaying every unfoldment and progress of the game so as to set a video mode control table as shown in FIG. 5, and display the fixed background image region while selecting a fixed frame ID (identification number) when a user feeling a visually induced motion sickness inputs "visually induced motion sickness occurring" by using a keyboard or a controller, or when a visually induced motion sickness detection software detects a biological sensor (for example, a smart watch which detects pulse wave, heart rate and blood pressure fluctuation caused by a low-frequency fluctuation called as Mayer waves and having about 10 second cycle in a blood circulation) and "visually induced motion sickness occurring" on the basis of a biological information sensor.

For example, the present video display system sets the display area rate of the fixed background image region high in a game content video in which the game unfoldment (the video pan speed) is fast and the visually induced motion sickness highly likely occurs, and sets the display area rate of the fixed background image region comparatively low in a game content video in which the game unfoldment (the video pan speed) is comparatively slow and the visually induced motion sickness less likely occurs. Further, the present video display system may be structured such as to select the fixed frame ID in correspondence to a degree and a frequency at which the visually induced motion sickness occurs due to the game content video in correspondence to the game unfoldment and display the fixed background image region, when the user feeling the visually induced motion sickness inputs "visually induced motion sickness occurring" by using the keyboard or the controller, or when the biological information sensor and the visually induced motion sickness detection software detect.

For example, the present embodiment may be a game video display system for a display including a game computer displaying a game content video as a virtual reality space in a display unit for a display on the basis of an unfoldment change in correspondence to a game progress, in which the game computer is provided with a video mode control table setting a display area rate of a fixed background image region surrounding a part or a whole of a periphery of a game video region displaying in correspondence to a game unfoldment and progress every fixed frame ID, and a visually induced motion sickness detection software detecting "visually induced motion sickness occurring" when the user inputs "visually induced motion sickness occurring" or on the basis of a biological information sensor. The game video display system may operate so as to display in a display unit a three-dimensional video data which sets in the display unit a game content video region, and a fixed background image region surrounding at least a part of the content video region, while referring to the fixed fame ID set in the video mode control table, when the user feeling the visually induced motion sickness inputs "visually induced motion sickness occurring" or when a visually induced motion sickness detection software detects "visually induced motion sickness occurring" on the basis of a biological information sensor.

Further, the fixed background image region is preferably a while, black or other simple color or a predetermined pattern design which can be clearly viewed and distinguished from the game content video region in the same manner as the embodiment mentioned above. A shape of the game content video region may be a circular shape, a trapezoidal shape, a polygonal shape or an oval shape. A shape of the fixed background image region may be a shape surrounding a part or a whole of the content video region, and may be alternatively a rectangular quadrangle which is arranged only in a lower side, only in an upper side or only in any one of right and left sides of the three-dimensional video data, or may be a circular arc shape.

Further, the present invention can be described as follows.
[Feature 1]
A video display system for a display including a computer which displays a content video as a virtual reality space in a display unit of the display, wherein the computer displays in the display unit a three-dimensional video data which sets a content video region, and a fixed background image region surrounding at least a part of the content video region.
[Feature 2]
The video display system for the display as described in the feature 1, wherein the computer changes the fixed background image region on the basis of the content video.
[Feature 3]
The video display system for the display as described in the feature 1 or 2, wherein the computer divides the content video region into a plurality of regions and display, on the basis of progress of the content video.
[Feature 4]
The video display system for the display as described in any one of the features 1 to 3, wherein the computer sequentially displays the plurality of divided content video regions on the basis of a progressing direction of the content video.
[Feature 5]
The video display system for the display as described in any one of the features 1 to 4, wherein the computer sequentially displays the divided content video regions in a direction in which an object contained in the content video moves, on the basis of a progressing direction of the content video.
[Feature 6]
The video display system for the display as described in any one of the features 1 to 5, wherein the computer sequentially displays the divided content video regions in a direction in which a visual line of a user detected by the display moves.
[Feature 7]
The video display system for the display as described in any one of the features 1 to 6, wherein the computer changes a magnitude of the fixed background image region on the basis of progress of the content video.
[Feature 8]
A video display method for a display using a computer which displays a content video as a virtual reality space in a display unit of the display, wherein the method makes the computer display in the display unit a three-dimensional video data which sets a content video region, and a fixed background image region surrounding at least a part of the content video region.
[Feature 9]
A video display program for a display using a computer which displays a content video as a virtual reality space in a display unit of the display, wherein the program makes the computer execute a function of displaying in the display unit a three-dimensional video data which sets a content video region, and a fixed background image region surrounding at least a part of the content video region.

The invention claimed is:

1. A video display system for a head-mounted display, the head-mounted display including a display, the video display system comprising:
   a computer which displays a content video containing an object as a virtual reality space in the display of the head-mounted display; and
   a sensor that detects an individual body condition of a user of the head-mounted display,
   wherein the computer displays the content video in the display as three-dimensional video data and sets, while displaying the content video, a content video region and a fixed background image region surrounding at least a part of the content video region,
   the computer stores, in a memory, a frame identification number of the content video in association with an initial condition value of the fixed background image region, the content video region and the fixed background image region being set in accordance with the initial condition value,
   the initial condition value sets a ratio of an area of the fixed background image region to an area of the display,
   the computer further stores, in the memory, the frame identification number in association with a user regulation value, the user regulation value being associated with the user,
   the computer automatically increases or decreases the user regulation value, which is stored in the memory in association with the frame identification number and the initial condition value, based on the individual body condition of the user, and
   the computer sets the fixed background image region and the content video region for the content video by adjusting the initial condition value based on the user regulation value.

2. The video display system according to claim 1, wherein the computer changes the fixed background image region based on the content video.

3. The video display system according to claim 1, wherein the computer divides the content video region into a plurality of divided content video regions based on progress of the content video and displays the content video in the plurality of regions.

4. The video display system according to claim 3, wherein the computer sequentially displays the plurality of divided content video regions based on a progressing direction of the content video.

5. The video display system according to claim 3, wherein the computer sequentially displays the plurality of divided content video regions in a direction in which the object contained in the content video moves, based on a progressing direction of the content video.

6. The video display system according to claim 4, wherein the computer sequentially displays the plurality of divided content video regions in a direction in which the object contained in the content video moves, based on the progressing direction of the content video.

7. The video display system according to claim 3, wherein the computer detects a direction in which a visual line of the user moves, and sequentially displays the plurality of divided content video regions in the direction in which the visual line of the user is detected.

8. The video display system according to claim 4, wherein the computer detects a direction in which a visual line of the user of the head-mounted display moves, and sequentially displays the plurality of divided content video regions in the direction in which the visual line of the user is detected.

9. The video display system according to claim 1, wherein the computer changes a magnitude of the fixed background image region based on progress of the content video.

10. The video display system according to claim 2, wherein the computer changes a magnitude of the fixed background image region based on progress of the content video.

11. The video display system according to claim 3, wherein the computer changes a magnitude of the fixed background image region based on the progress of the content video.

12. The video display system according to claim 4, wherein the computer changes a magnitude of the fixed background image region based on the progress of the content video.

13. The video display system according to claim 5, wherein the computer changes a magnitude of the fixed background image region based on the progress of the content video.

14. The video display system according to claim 6, wherein the computer changes a magnitude of the fixed background image region based on the progress of the content video.

15. The video display system according to claim 2, wherein the computer divides the content video region into a plurality of regions; based on progress of the content video and displays the content video in the plurality of regions.

16. The video display system according to claim 1, wherein
   the computer further increases or decreases the user regulation value, which is stored in the memory in association with the frame identification number and the initial condition value, based on an input of the user.

17. A video display method for a head-mounted display, the head-mounted display including a display, the video display method comprising;
   displaying, using a computer, a content video as a virtual reality space in the display of the head-mounted display; and
   detecting, using a sensor, an individual body condition of a user of the head-mounted display,
   wherein the computer displays the content video in the display as three-dimensional video data and sets, while displaying the content video, a content video region and a fixed background image region surrounding at least a part of the content video region,
   the computer stores, in a memory, a frame identification number of the content video in association with an initial condition value of the fixed background image region, the content video region and the fixed background image region being set in accordance with the initial condition value,
   the initial condition value sets a ratio of an area of the fixed background image region to an area of the display,
   the computer further stores, in the memory, the frame identification number in association with a user regulation value, the user regulation value being associated with the user,
   the computer automatically increases or decreases the user regulation value, which is stored in the memory in association with the frame identification number and the initial condition value, based on the individual body condition of the user, and the computer sets the fixed background image region and the content video region for the content video by adjusting the initial condition value based on the user regulation value.

18. A non-transitory computer-readable medium including a video display program for a head-mounted display, the head-mounted display including a display, the video display program configured to cause a computer to perform operations, the operations comprising:
   displaying a content video as a virtual reality space in the display of the head-mounted display; and
   detecting, using a sensor, an individual body condition of a user of the head-mounted display,
   wherein the video display program causes the computer to display the content video in the display as three-dimensional video data, and set, while displaying the content video, a content video region and a fixed background image region surrounding at least a part of the content video region,
   the video display program causes the computer to store, in a memory, a frame identification number of the content video in association with an initial condition value of the fixed background image region, the content video region and the fixed background image region being set in accordance with the initial condition value,
   the initial condition value sets a ratio of an area of the fixed background image region to an area of the display,
   the computer further stores, in the memory, the frame identification number in association with a user regulation value, the user regulation value being associated with the user,
   the computer automatically increases or decreases the user regulation value, which is stored in the memory in association with the frame identification number and the initial condition value, based on the individual body condition of the user, and
   the computer sets the fixed background image region and the content video region for the content video by adjusting the initial condition value based on the user regulation value.

* * * * *